United States Patent [19]
Zaccone et al.

[11] Patent Number: 5,797,239
[45] Date of Patent: Aug. 25, 1998

[54] TITANIUM REINFORCED STRUCTURAL PANEL HAVING A PREDETERMINED SHAPE

[75] Inventors: Mark A. Zaccone, Maryland Heights; Jeffery D. Russom, Chesterfield, both of Mo.

[73] Assignee: McDonnell Douglas Corporation, St. Louis, Mo.

[21] Appl. No.: 782,228

[22] Filed: Jan. 13, 1997

Related U.S. Application Data

[62] Division of Ser. No. 411,477, Mar. 28, 1995.

[51] Int. Cl.$^6$ ............................................. E04C 2/34
[52] U.S. Cl. ................... 521/793.1; 52/796.1; 228/181; 228/262.71
[58] Field of Search .................... 428/586, 593; 420/902; 228/157, 181, 193, 262.71; 52/793.1, 794.1, 796.1

[56] References Cited

U.S. PATENT DOCUMENTS

| | | |
|---|---|---|
| 3,123,907 | 3/1964 | Thomas. |
| 3,340,589 | 9/1967 | Jaeger. |
| 3,349,464 | 10/1967 | Becker, Jr. et al.. |
| 3,924,793 | 12/1975 | Summers et al.. |
| 3,927,817 | 12/1975 | Hamilton et al.. |
| 4,197,978 | 4/1980 | Kasper. |
| 4,217,397 | 8/1980 | Hayase et al.. |
| 4,220,276 | 9/1980 | Weisert et al.. |
| 4,263,375 | 4/1981 | Elrod. |
| 4,294,419 | 10/1981 | Fouse et al.. |
| 4,301,584 | 11/1981 | Dillner et al.. |
| 4,304,821 | 12/1981 | Hayase et al.. |
| 4,331,284 | 5/1982 | Schulz et al.. |
| 4,393,987 | 7/1983 | Anderson et al.. |
| 4,394,871 | 7/1983 | Czajka et al.. |
| 4,460,657 | 7/1984 | Elrod et al.. |

(List continued on next page.)

FOREIGN PATENT DOCUMENTS

| | | | |
|---|---|---|---|
| 2647-382A | 5/1989 | France. | |
| 1165546 | 7/1985 | U.S.S.R. | 228/193 |

OTHER PUBLICATIONS

*Superplastic Forming/Diffusion Bonding*, NA-77-902, Rockwell International, Rev. 8-78, pp. 1-16.

Primary Examiner—Carl D. Friedman
Assistant Examiner—Beth A. Aubrey
Attorney, Agent, or Firm—The Bell Seltzer Intellectual Property Law Group of Alston & Bird LLP

[57] ABSTRACT

A method of fabricating a structural panel having a predetermined shape in which an inflatable envelope assembly is formed from at least a pair of superplastically formed and diffusion bonded metallic core sheets. The inflatable envelope assembly can be disposed between first and second metallic face sheets which are generally superplastically formed into the predetermined shape prior to being assembled. Thereafter, the assembled face sheets and the inflatable envelope assembly can be superplastically formed and diffusion bonded to form an integral structure, such as structural panel having a compound curvature. Alternatively, the inflatable envelope assembly can be disposed between a pair of reinforced titanium composite sheets. The reinforced titanium composite sheets can also be joined to adjacent face sheets, such as by welding or diffusion bonding, such that an integral structural panel having the predetermined shape can be readily fabricated. The reinforced titanium composite sheets have a flow stress greater than the inflatable envelope assembly and the face sheets to provide increased strength and stiffness for the resulting structural panel. The structural panel can also have a variety of predetermined shapes, such as predetermined complex shapes including shapes having a predetermined compound curvature. The resulting structural panel, such as a wing, wing tip or fan blade, is also generally smooth so as to eliminate mold line defects which adversely affect the aerodynamic performance of the structural panel.

5 Claims, 3 Drawing Sheets

U.S. PATENT DOCUMENTS

| | | |
|---|---|---|
| 4,509,671 | 4/1985 | Weisert . |
| 4,595,297 | 6/1986 | Liu et al. . |
| 4,597,946 | 7/1986 | Ward . |
| 4,607,783 | 8/1986 | Mansbridge et al. . |
| 4,632,296 | 12/1986 | Mansbridge et al. . |
| 5,055,143 | 10/1991 | Runyan et al. . |
| 5,118,571 | 6/1992 | Petersen . |
| 5,141,146 | 8/1992 | Yasui ........................................ 228/193 |
| 5,182,158 | 1/1993 | Schaeffer ............................ 52/793.1 X |
| 5,214,948 | 6/1993 | Sanders et al. . |
| 5,240,376 | 8/1993 | Velicki . |
| 5,300,367 | 4/1994 | Bodart et al. . |
| 5,330,092 | 7/1994 | Gregg et al. . |
| 5,344,063 | 9/1994 | Johnston et al. ........................ 228/193 |

TITANIUM REINFORCED STRUCTURAL PANEL HAVING A PREDETERMINED SHAPE

This application is a divisional of U.S. patent application Ser. No. 08/411,477, filed Mar. 28, 1995.

FIELD OF THE INVENTION

The present invention relates generally to structural panels and associated methods for forming structural panels and, more particularly, to structural panels having a predetermined shape and associated methods for superplastically forming and diffusion bonding structural panels of the predetermined shape.

BACKGROUND OF THE INVENTION

In a number of applications, such as the aerospace and automobile industries, structural parts or structural panels are subjected to increasing loads which produce greater stresses and forces on the structural panel. For example, the fan blades of an aircraft and the leading edge or wing tip of an aircraft's wing are subjected to relatively large forces and require a part having sufficient strength and stiffness. Accordingly, generally solid structural panels, such as solid fan blades or sheet metal built-up structures such as wing tips, have been fabricated which provide sufficient strength.

However, solid parts and built-up structures are generally relatively heavy, which may limit their utility or, in the example of a fan blade, require additional energy and drive electronics to rotate the fan blade. Thus, methods have been developed to fabricate superplastically formed and diffusion bonded structural panels.

Superplasticity is the characteristic demonstrated by certain metals to develop unusually high tensile elongations with minimum necking when deformed within a limited temperature and strain rate range. This characteristic, peculiar to certain metals and metal alloys, has been known in the art as applied to the production of metallic structures as described in detail below. It is further known that at the same superplastic forming temperatures, the metals and metal alloys which exhibit superplasticity can be diffusion bonded with the application of sufficient pressure at contacting surfaces.

Various types of metallic structures have been superplastically formed and diffusion bonded. For example, in a process typically referred to as a three-sheet process, a metallic structure is formed from three metallic sheets, typically an inner sheet and a pair of opposed face sheets. For example, the three-sheet process and the resulting metallic structure is disclosed by U.S. Pat. No. 3,924,793 which issued Dec. 9, 1975 to Summers et al. and is assigned to British Aircraft Corporation Limited; and U.S. Pat. No. 3,927,817 which issued Dec. 23, 1975 to Hamilton, et al. and is assigned to Rockwell International Corporation (hereinafter the '793 and the '817 patents, respectively).

Both the '793 patent and the '817 patent describe methods for superplastically forming metallic sandwich structures from metallic sheets which are joined at selected areas and expanded superplastically. According to the three-sheet method disclosed by these patents, however, the metallic sheets are generally bonded, such as by diffusion bonding, prior to any superplastic forming operations. In particular, the inner sheet is bonded to the outer face sheets. Thereafter, by applying tensile stress to the face sheets, such as by applying gas pressure between the face sheets, the inner sheet is drawn outwardly with the expanding face sheets to which it is joined during the superplastic forming operation.

Since the metallic sheets are diffusion bonded prior to the superplastic forming operations, both the '793 patent and the '817 patent include selectively controlling the diffusion bonding between the metallic sheets in the areas which are to be superplastically formed. In particular, the '793 patent describes a method of controlling the diffusion bonding of the metallic sheets by inserting spacers between the metallic sheets in the areas which are to be diffusion bonded. Alternatively, the '817 patent discloses the use of maskants which are applied to those areas which are to be superplastically formed and which, consequently, should not be attached or joined. Typically, maskants, such as graphite, boron nitride and yttria, are employed. However, such maskants can disadvantageously embrittle the resulting structure if they are not readily removed. The removal of the maskants is complicated, if not rendered impossible, in complex sandwich structures, it is difficult, if not impossible, however since the interior surfaces of the resulting superplastically formed structure are generally inaccessible.

The '817 patent also discloses structural panels having continuous bonds with apertures or vent holes provided in the masked areas. The vent holes are intended to eliminate unwanted pressure differentials between the various interior compartments during the superplastic forming operations which could distort the resulting structure. However, the vent holes can be stretched and enlarged during the superplastic forming operations and can eventually produce fatigue crack initiation sites.

Regardless of the particular method employed, the three-sheet process generally produces a metallic sandwich structure which has a truss core structure. The truss core structure produced by the three-sheet process does not typically include significant transverse stiffening, but, instead, includes one or more canted elements which extend between the opposed face sheets at an angle which is not perpendicular to the face sheets. In other words, the angle defined between the canted element and a face sheet is less than 90°.

In order to produce structural panels which include, among other things, increased transverse strength or stiffness, another superplastic forming and diffusion bonding process, typically termed a four-sheet process, has been developed. An exemplary four-sheet process is disclosed in U.S. Pat. Nos. 4,217,397 and 4,304,821 (hereinafter the '397 and the '821 patent, respectively), both of which issued to Hayase, et al. and are assigned to McDonnell Douglas Corporation, the assignee of the present application. The respective disclosures of both the '397 and '821 patents are hereby incorporated by reference. In general, the '397 patent discloses a four-sheet metallic sandwich structure having a pair of core sheets and a pair of opposed face sheets, while the '821 patent discloses the corresponding method of fabricating the structure disclosed in the '397 patent.

More specifically, the '397 patent discloses a metallic sandwich structure in which metallic core sheets are joined by an intermittent weld. The joined core sheets are thereafter sealed by a continuous weld, such as along corresponding edge portions, to form an expandable envelope. Following the placement of the joined core sheets in a limiting structure, such as a containment die, an inert gas is injected to interior portions of the joined core sheets to thereby superplastically form or expand the core sheets. In particular, by applying appropriate pressure and temperature to the assembled structure, the core sheets are expanded against and diffusion bonded to the surrounding face sheets, thereby producing the resulting structural panel. The core configuration of the resulting structural panel is generally defined by the intermittent weld pattern, as described in detail in the '397 and '821 patents.

Structural panels, such as fan blades, often have a complex shape, such as a shape having compound curvature, that is, a shape which varies in three mutually orthogonal directions. However, conventional metallic structure which are formed according to either of the three-sheet process or the four-sheet process are generally limited in the shapes in which the resulting metallic structure can be formed. For example, the face sheets of conventional metallic structure formed by either the three-sheet process or the four-sheet process typically wrinkle during formation of a structural panel having a compound curvature. In addition to potentially decreasing the structural integrity of the resulting metallic structure, the wrinkled face sheets create mold line defects which can impair the aerodynamic performance of the vehicle which incorporates the metallic structure, or otherwise impair the utility of the resulting metallic structure.

In addition, the materials which exhibit superplasticity generally include metals and metal alloys, each of which has a predetermined flow stress or strength. While these metals and metal alloys are relatively strong, it is desirable, in some instances, for the resulting structure to be stronger than the relative strengths provided by the metals and metal alloys which exhibit superplasticity. For example, it is desirable for the fan blades and wing tips of modern aircraft to have a predetermined strength and stiffness which exceeds the relative strength provided by metals and metal alloys which have superplastic properties.

SUMMARY OF THE INVENTION

It is therefore an object of one aspect of the present invention to provide an improved method for fabricating a structural panel having a predetermined shape.

It is an additional object of another aspect of the present invention to provide an improved method for fabricating a structural panel having a predetermined complex curvature.

It is a further object of yet another aspect of the present invention to provide a method for superplastically forming and diffusion bonding a structural panel incorporating composite materials for providing increased strength and stiffness to the resulting structural panel.

These and other objects are provided, according to the present invention, by a method of fabricating a superplastically formed, diffusion bonded structural panel having a predetermined shape. For example, the structural panel can have a predetermined complex curvature. In addition, one aspect of the method of the present invention provides for fabrication of an integral structural panel having a reinforced titanium composite material for strengthening the resulting structure.

The structural panel generally includes first and second metallic core sheets joined along respective edge portions to thereby form an inflatable envelope assembly. In one embodiment, the inflatable envelope assembly is superplastically formed, such as to an intermediate state in which the inflatable envelope assembly is partially expanded, so as to have the predetermined shape. In the intermediate state, the superplastic forming of the inflatable envelope assembly is halted prior to diffusion bonding portions of the first core sheet to portions of the second core sheet. During the superplastic formation of the inflatable envelope assembly, the inflatable envelope assembly can be disposed in a containment die which defines a cavity having the predetermined shape, such that the inflatable envelope assembly superplastically forms to the predetermined shape.

In one embodiment, the structural panel also includes a pair of metallic face sheets which are also preferably superplastically formed into the predetermined shape. The metallic face sheets and the inflatable envelope assembly can then be assembled by disposing the inflatable envelope assembly between the preformed first and second metallic face sheets. The assembled inflatable envelope assembly and the metallic face sheets can thereafter be further superplastically formed and diffusion bonded to thereby form an integral structural panel having the predetermined shape.

In another embodiment, the structural panel includes first and second reinforced titanium composite sheets which are also formed into the predetermined shape. The first and second preformed reinforced titanium composite sheets of this embodiment are disposed on opposite sides of the inflatable envelope assembly to strengthen the resulting structural panel. Preferably, the reinforced titanium composite sheets have a predetermined flow stress which is greater than the predetermined flow stress of the pair of metallic core sheets such that the reinforced titanium composite sheets increase the relative strength of the resulting structural panel. In yet another embodiment, the structural panel includes both a pair of metallic face sheets and one or more reinforced titanium composite sheets. In this embodiment, each reinformed titanium composite sheet is disposed between the inflatable envelope assembly and a respective metallic face sheet. In addition, each reinforced titanium composite sheet is preferably joined to the respective face sheet such that an integral structural panel can be formed.

The inflatable envelope assembly is preferably superplastically formed and diffusion bonded by creating a pressure differential between the interior and exterior portions of the inflatable envelope assembly. The assembled face sheets, reinforced titanium composite sheets and the inflatable envelope assembly can then be heated such that the first and second core sheets superplastically form and diffusion bond to the adjacent sheets, such as adjacent reinforced titanium composite sheets or the adjacent face sheets. In addition, during this diffusion bonding process, edge portions of the assembled structural panel are preferably retained, such as in a closure or root fitting, such that the face sheets, the reinforced titanium composite sheets and the inflatable envelope assembly are maintained in a predetermined fixed relationship.

In one embodiment, the pressure differential is created between interior and exterior portions of the inflatable envelope assembly by defining at least one port in the inflatable envelope assembly in fluid communication with the internal portion thereof. Thereafter, fluid can be injected through the port defined in the inflatable envelope assembly to increase the fluid pressure within the internal portion of the inflatable envelope assembly.

One or more additional core sheets can also be joined to the first and second core sheets along respective edge portions to thereby form an inflatable envelope assembly having a plurality of interior portions. In addition, the interior portions of the first and second core sheets can be joined by a discontinuous weld pattern. Thereafter, during superplastic formation of the inflatable envelope assembly, strengthening webs are formed which extend between the interior portions of the first and second core sheets which are joined by the discontinuous weld pattern.

Therefore, a structural panel, such as a generally hollow structural panel having a predetermined shape, can be superplastically formed and diffusion bonded according to the present invention. The structural panel can include one or more sheets of reinforced titanium composite material to increase the relative strength of the resulting structural panel. By preforming the inflatable envelope assembly, the metallic face sheets and the reinforced titanium composite sheets to the predetermined shape, a structural panel having a predetermined complex curvature can also be readily formed. For example, complexly curved airfoils, such as fan blades or wing tips can be formed according to the method of the present invention without wrinkling the face sheets.

DETAILED DESCRIPTION OF THE PREFERRED EMBODIMENTS

The present invention will now be described more fully hereinafter with reference to the accompanying drawings, in which a preferred embodiment of the invention is shown. This invention may, however, be embodied in many different forms and should not be construed as limited to the embodiments set forth herein; rather, this embodiment is provided so that this disclosure will be thorough and complete and will fully convey the scope of the invention to those skilled in the art. Like numbers refer to like elements throughout.

Figure 1:
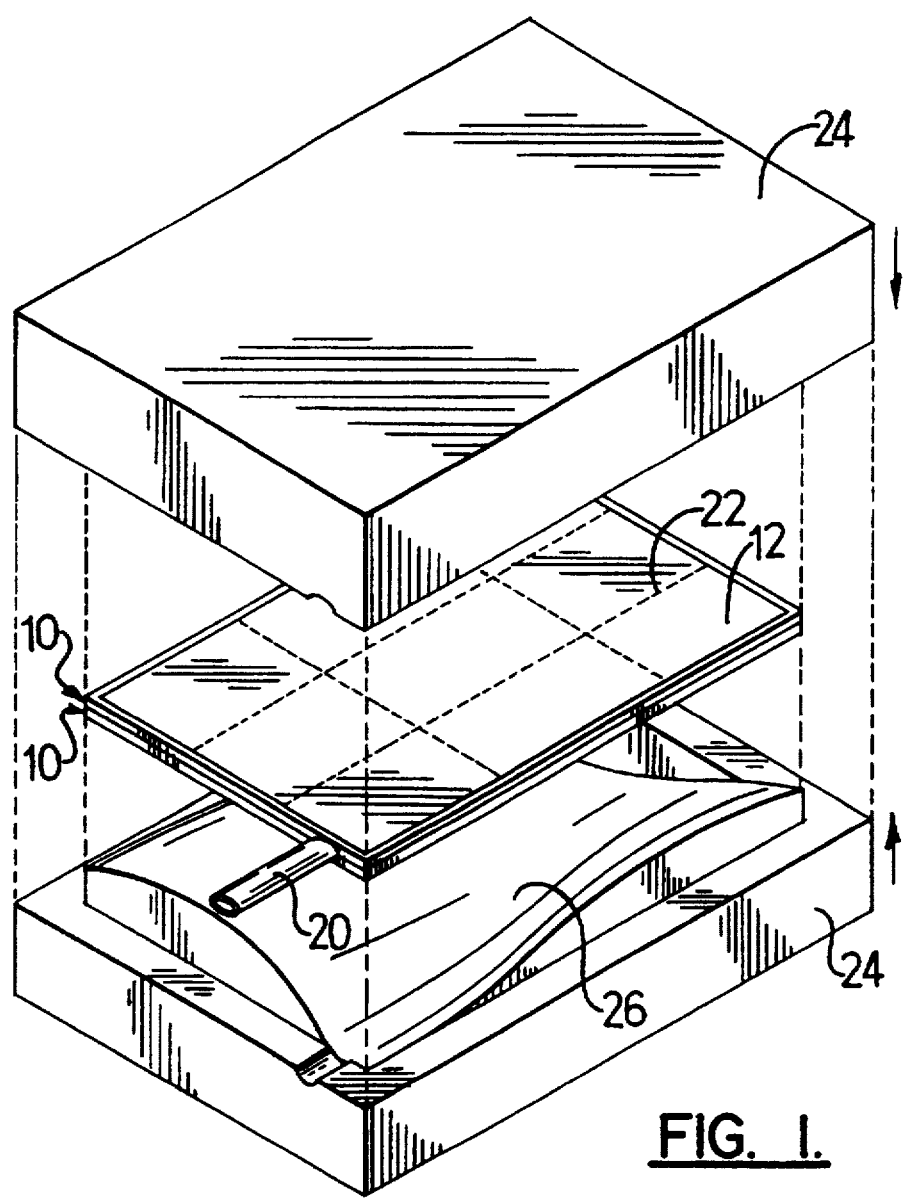
FIG. 1 is an exploded perspective view of an inflatable envelope assembly and an associated containment die prior to the superplastic formation of the inflatable envelope assembly.

Referring now to FIG. 1, first and second metallic core sheets 10 which comprise a portion of the structural panel 40 of the present invention are illustrated. The first and second metallic core sheets have superplastic properties, that is, the first and second metallic core sheets exhibit the characteristic of unusually high tensile elongation with minimum necking when deformed within a limited temperature range and strain rate range. As known to those skilled in the art, a number of materials demonstrate superplastic properties, such as titanium and titanium alloys, including Ti-6A1-4V. The superplastic temperature range varies depending upon the specific material used, however, a temperature which is slightly below the phase transformation temperature of the specific material is preferable for superplastic forming operations. For example, titanium alloys generally exhibit superplastic properties for temperatures near between about 1450° F. and about 1850° F. The preferred strain rate is typically determined experimentally for each configuration of the structural panel formed, however, the strain rate is generally approximately $10^{-4}$ in./in./sec. for balanced or stable deformation of the structural panel. As also known to those skilled in the art, if the strain rate is too rapid, the material being deformed may blow out. Conversely, if the strain rate is too slow, the plasticity of the material being deformed may decrease or the rate of forming may be so slow that it is no longer economical.

In addition to the superplastic properties, the first and second metallic core sheets 10 are preferably capable of diffusion bonding. Diffusion bonding generally refers to the solid state joining of the surfaces of similar or dissimilar metals or metal alloys by applying heat and pressure for a length of time to cause commingling of the atoms at the joint interface. By way of distinction, fusion bonding or welding generally refers to the metallurgical joining or welding of the surfaces of similar or dissimilar metals by applying heat so as to cause the materials at the joined interface to reach the liquid or plastic state and to thereby merge into a unified whole.

As illustrated in FIG. 1, the first and second metallic core sheets 10 are joined, such as by welding, along respective edge portions 12 to form an inflatable envelope assembly 14. The inflatable envelope assembly includes interior and exterior portions 16 and 18, respectively. In addition, the inflatable envelope assembly can include at least one port 20 in fluid communication with the internal portion thereof. As further illustrated in FIG. 1, interior portions of the first and second core sheets can also be joined by a discontinuous weld pattern 22. The discontinuous weld pattern can be formed in a variety of designs as described and illustrated in the '397 and '821 patents.

Further, while the inflatable envelope assembly 14 illustrated in FIG. 1 is comprised of first and second metallic core sheets 10, one or more additional core sheets can also be joined, such as by welding, along respective edge portions 12 to the first and second core sheets to form an inflatable envelope assembly having a plurality of interior portions 16. Preferably, a respective port 20 is defined in fluid communication with each interior portion such that fluid can be injected therein as discussed below. As described above, interior portions of an inflatable envelope assembly comprised of three or more metallic core sheets can also be joined by a discontinuous weld pattern to produce a number of strengthening webs as described in detail below. In particular, each pair of adjacent core sheets can be joined by the same weld pattern or two or more different weld patterns can be employed to join the various metallic core sheets.

Figure 2:
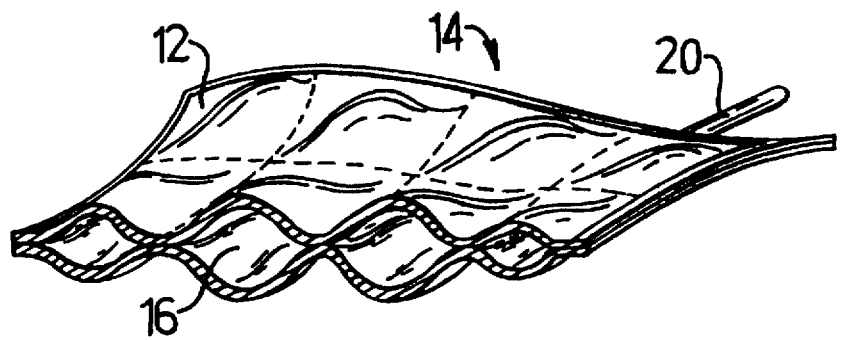
FIG. 2 is a fragmentary perspective view of a partially expanded inflatable envelope assembly.

Once the metallic core sheets 10 have been joined to form the inflatable envelope assembly 14, the inflatable envelope assembly is preferably superplastically formed. In particular, the inflatable envelope assembly is preferably superplastically formed to an intermediate state in which the inflatable envelope assembly is partially expanded as shown in FIG. 2. According to one aspect of the present invention, the superplastic forming of the inflatable envelope assembly is preferably halted prior to diffusion bonding portions of the first core sheet to portions of the second core sheet such that the inflatable envelope assembly is partially superplastically expanded to the intermediate state.

As illustrated in an exploded perspective view in FIG. 1, the inflatable envelope assembly 14 is generally disposed in a containment die 24, such as a forming tool or a limiting fixture. The containment die defines a cavity 26 having a predetermined shape. For example, the predetermined shape can have a compound curvature and may, for example, define the predetermined shape of a fan blade.

Once the inflatable envelope assembly 14 has been disposed in the containment die 24, a pressure differential is created between interior and exterior portions of the inflatable envelope assembly. A pressure differential sufficient to subject the inflatable envelope assembly to strain within the predetermined strain range is preferably applied. The pressure differential is generally created by injecting fluid, such as an inert gas, through the port 20 defined in the inflatable envelope assembly, thereby increasing the fluid pressure within the internal portion of the inflatable envelope assembly. Concurrently with the establishment of a pressure differential between interior and exterior portions of the inflatable envelope assembly, the inflatable envelope assembly is heated to a temperature within the superplastic temperature range of the material forming the inflatable envelope assembly. Thus, the inflatable envelope assembly superplastically deforms to the predetermined shape defined by the cavity 26 of the containment die.

Figure 3:
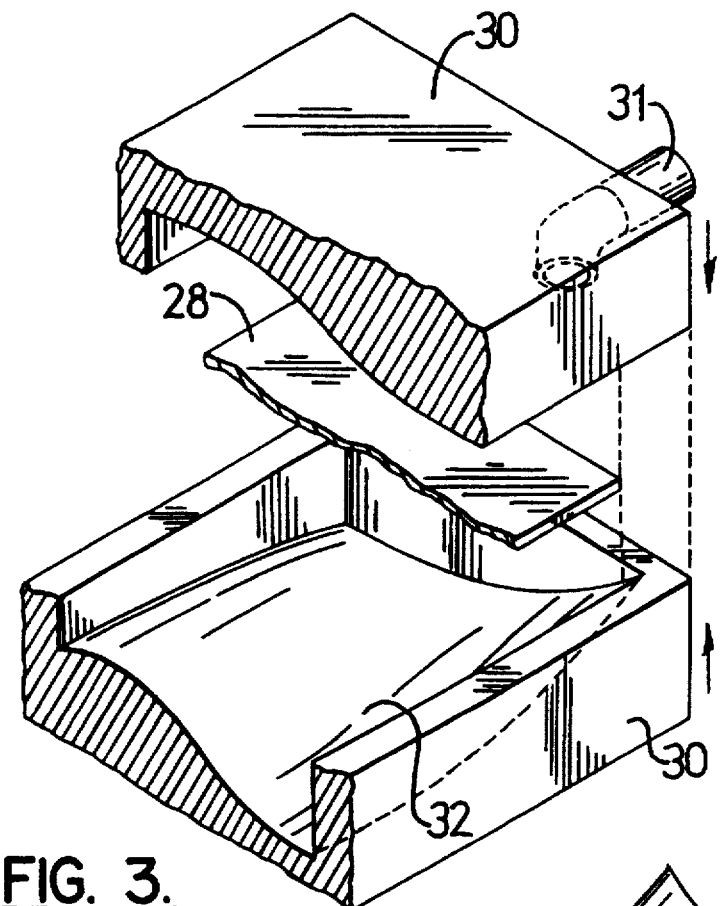
FIG. 3 is an exploded perspective view of a metallic face sheet and an associated containment die having a cavity defining the predetermined shape of the resulting structural panel.

The metallic structure 40 also preferably includes first and second metallic face sheets 28. The metallic face sheets are also comprised of a material having superplastic properties, such as titanium or titanium alloys, including Ti-6A1-4V. As shown in FIG. 3, the first and second metallic face sheets are also superplastically formed and, more preferably, are superplastically formed to the predetermined shape. In particular, the metallic face sheets are also preferably disposed in a containment die 30 having a cavity 32 defining the predetermined shape and are subjected to temperatures for the superplastic temperature range of the material forming the face sheets. In addition, fluid, such as an inert gas, is injected into the cavity, such as through port 31, such that the face sheets superplastically form to the predetermined shape defined by the containment die.

Figure 4:
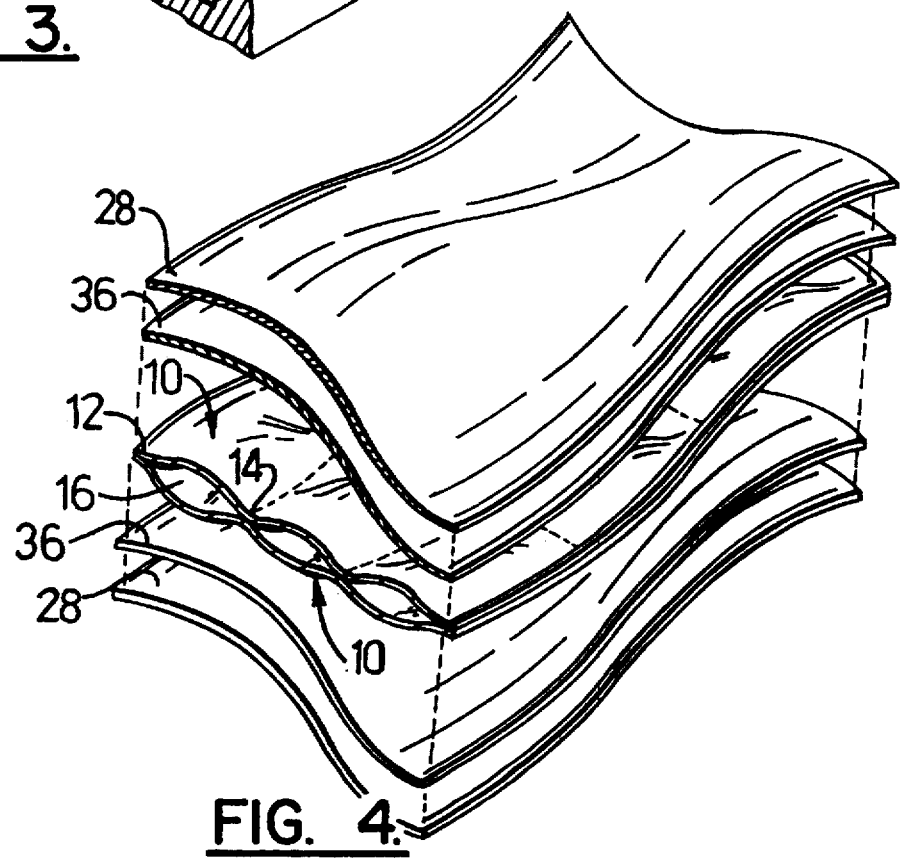
FIG. 4 is an exploded perspective view illustrating an inflatable envelope assembly sandwiched between a pair of opposed reinforced titanium composite sheets which, in turn, are sandwiched between a pair of opposed metallic face sheets, each of which have been preformed into the predetermined shape.
Figure 5:
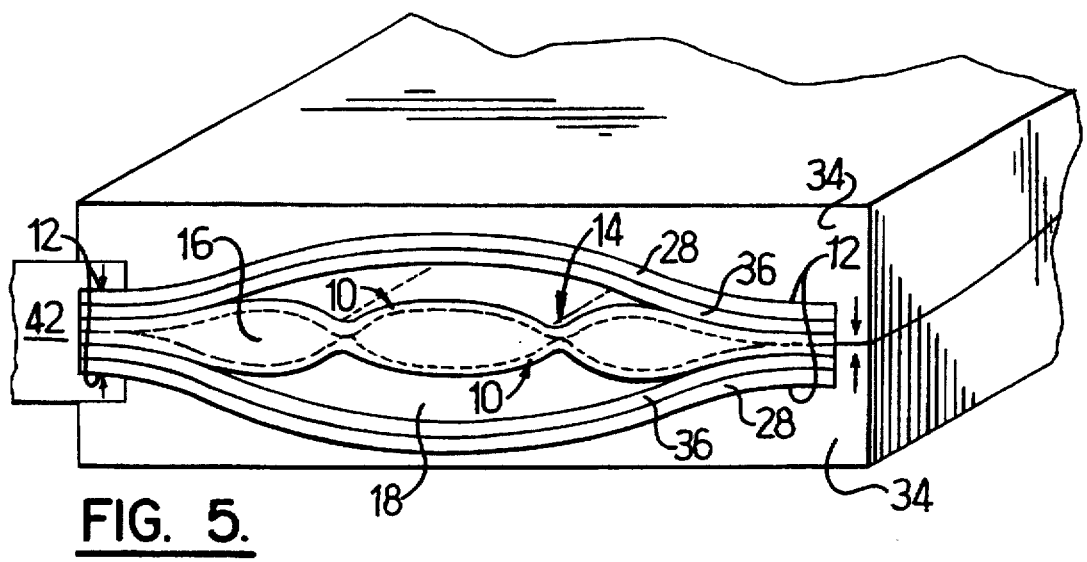
FIG. 5 is a fragmentary perspective view of the assembled structural panel of FIG. 4 disposed in the cavity defined by a containment die and having the respective edge portions of the sheets held in a fixed relationship by a root fitting.
Figure 6:
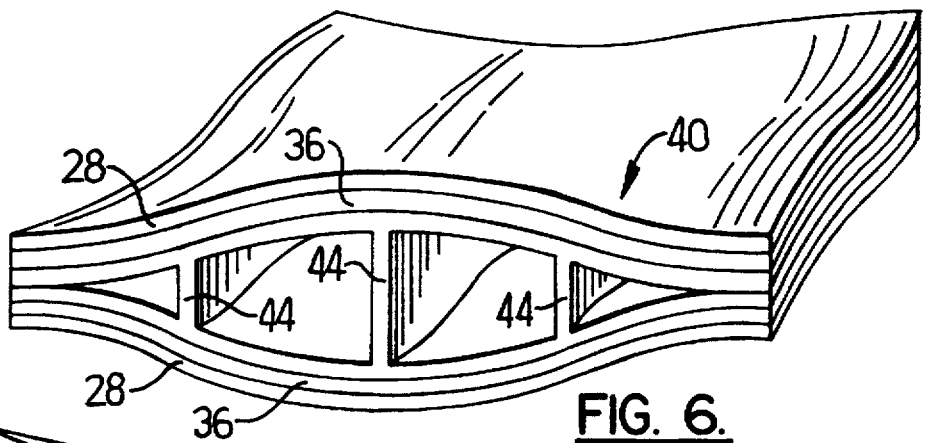
FIG. 6 is a fragmentary perspective view of a structural panel according to the present invention which includes a plurality of strengthening webs extending between the pair of metallic core sheets.

Thereafter, the partially expanded inflatable envelope assembly 14 can be disposed between the superplastically preformed first and second metallic face sheets 28 as shown in FIGS. 4 and 5. Edge portions 12 of the first and second metallic face sheets are preferably joined, such as by welding, to edge portions of the inflatable envelope assembly to form a pressure vessel between the first and second face sheet. By superplastically forming and diffusion bonding the inflatable envelope assembly to the first and second metallic face sheets, an integral structural panel 40 having the predetermined shape is formed as shown in FIG. 6.

As described above in conjunction with the superplastic formation of the inflatable envelope assembly 14 to an intermediate state, the inflatable envelope assembly and the first and second face sheets 28 are preferably disposed in a containment die 34 having a cavity defining the predetermined shape of the resulting part. The inflatable envelope assembly and the first and second metallic face sheets are then preferably superplastically formed and diffusion bonded by creating a pressure differential within the pressure vessel between interior and exterior portions of the inflatable envelope assembly and simultaneously heating the first and second metallic face sheets and the inflatable envelope assembly to a temperature within the superplastic temperature range.

Figure 7:
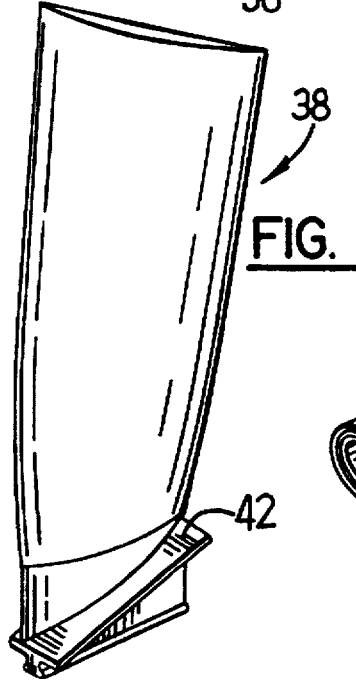
FIG. 7 is a perspective view of a fan blade having a compound curvature and disposed within a root fitting according to the present invention.
Figure 8:
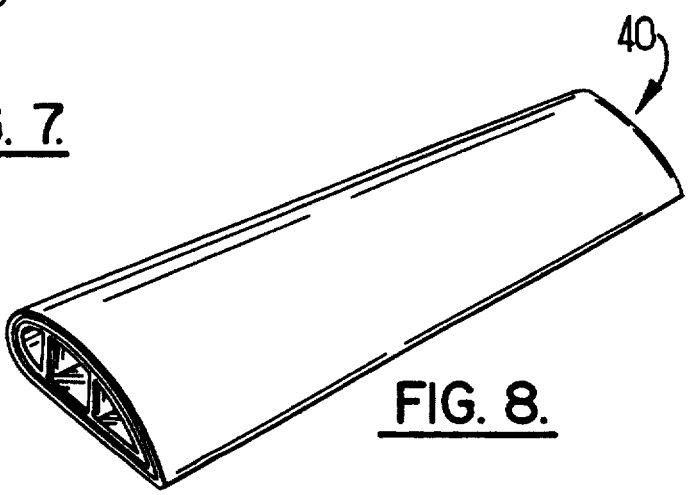
FIG. 8 is a fragmentary perspective view of a wing tip having a compound curvature and formed according to the present invention.

Accordingly, a structural panel 40 having the predetermined shape, such as a shape which has compound curvature, can be readily formed. In particular, by individually preforming the metallic face sheets 28 and the inflatable envelope assembly 14 prior to superplastically forming and diffusion bonding the assembled metallic face sheets and the inflatable envelope assembly into an integral structure, the metallic face sheets generally do not wrinkle as in conventional superplastic forming techniques. Accordingly, structural panels having predetermined complex shapes, such as predetermined shapes which have compound curvature, can be fabricated according to the method of the present invention. For example, an airfoil, such as a fan blade 38 or a wing tip 39 as shown in FIGS. 7 and 8, respectively, which are generally hollow and which have compound curvature can be formed according to the present invention.

According to another aspect of the present invention, the structural panel 40 can also include a first reinforced titanium composite sheet 36 for increasing the relative strength of the structural panel. Typically, the first reinforced titanium composite sheet has a first predetermined flow stress and each of the metallic face sheets 28 has a second predetermined flow stress. According to this aspect of the present invention, the first predetermined flow stress of the reinforced titanium composite sheet is preferably greater than the second predetermined flow stress of the metallic face sheets. In particular, the first reinforced titanium composite sheet can be comprised of a titanium matrix composite material having flow stress of approximately 10,000 PSI at a temperature of about 1650° F. In contrast, metallic face sheets which are comprised of titanium generally have a flow stress of approximately 1,000 PSI at a temperature of about 1650° F. Consequently, by incorporating a reinforced titanium composite sheet within the structural panel, a stronger and stiffer structural panel is produced. Thus, the resulting structural panel will withstand more severe or higher stress applications, such as fan blades for modern aircraft engines which rotate rapidly and are subjected to relatively high aerodynamic static and dynamic forces. In addition, the resulting structural panel is generally hollow to reduce the energy requirements to drive or move the structural panel.

As known to those skilled in the art, reinforced titanium composite sheets 36 are generally formed by pressing together alternate layers of metallic foil and strengthening fibers, such as by a hot isostatic pressing (HIP) process. For example, the metallic foil can be comprised of titanium and the strengthening fibers can be comprised of silicon carbide. The strengthening fibers are preferably oriented in a predetermined direction corresponding to the direction in which the resulting reinforced titanium composite sheet will have the greatest strength and stiffness. By pressing the alternating layers, the fibers are consolidated into a matrix.

As shown in an exploded view in FIG. 4, the reinforced titanium composite sheet 36 is also preferably formed in the predetermined shape of the resulting structural panel 40. The preforming of the reinforced titanium composite sheet is particularly effective since the reinforced titanium composite sheet does not have superplastic properties. Accordingly, attempts at forming the reinforced titanium composite sheet after it has been assembled with the metallic sheets, such as the inflatable envelope assembly 14, will generally deform the metallic sheets as opposed to the reinforced titanium composite sheet.

In one embodiment, the inflatable envelope assembly 14 is disposed between first and second reinforced titanium composite sheets 36 such that the inflatable envelope assembly is sandwiched therebetween. Thereafter, the respective edge portion 12 of the reinforced titanium composite sheets are joined to the edge portions of the inflatable envelope assembly to form a pressure vessel between the first and second reinforced titanium composite sheets. In this embodiment, the assembled reinforced titanium composite sheets and the inflatable envelope assembly are disposed in a containment die 34 and the inflatable envelope assembly is superplastically formed and diffusion bonded as described above. Thus, the inflatable envelope assembly diffusion bonds to the reinforceable titanium composite sheets to form an integral structural panel. Consequently, the reinforced titanium composite sheets of the structural panel of this embodiment can be the outermost sheets of the resulting structure.

In another embodiment of the present invention which includes both a reinforced titanium composite sheet 36 and first and second face sheets 28, a first reinforced titanium composite sheet is disposed between the inflatable envelope assembly 14 and a respective face sheet. In particular, one reinforced titanium composite sheet is preferably joined to the adjacent face sheet, such as by welding or diffusion bonding prior to the assembly of the face sheets, the reinforced titanium composite sheet and the inflatable envelope assembly. Therefore, during the superplastic forming and diffusion bonding of the assembled face sheets, the reinforced titanium composite sheet and the inflatable envelope assembly, the inflatable envelope assembly expands by superplastic formation and diffusion bonds to the at least one reinforced titanium composite sheet such that an integral structural panel 40 is thereby formed.

As illustrated in FIGS. 4–6, the structural panel 40 can also include a second reinforced titanium composite sheet 36. The second reinforced titanium composite sheet is also formed into the predetermined shape and is disposed adjacent to the inflatable envelope assembly 14 and opposite the first reinforced titanium composite sheet such that the first and second reinforced titanium composite sheets sandwich the inflatable envelope assembly therebetween. In addition, the first and second metallic face sheets 28 preferably sandwich the first and second reinforced titanium composite sheets and the inflatable envelope assembly therebetween. As described above, the second reinforced titanium composite sheet is also preferably joined, such as by welding or diffusion bonding, to the adjacent face sheet such that by superplastically forming and diffusion bonding the inflatable envelope assembly to the first and second reinforced titanium composite sheets, an integral structural panel having the predetermined shape is thereby formed as illustrated in FIG. 6.

As shown in FIG. 5, the assembled first and second metallic face sheets 28, the first and second reinforced titanium composite sheets 36 and the inflatable envelope assembly 14 are preferably disposed within a containment die 34 during the superplastic forming and diffusion bonding of the inflatable envelope assembly to the first and second reinforced titanium composite sheets. As described above, the containment die advantageously has a cavity defining the predetermined shape such that the resulting structural panel 40 has the same predetermined shape. In addition, as also illustrated in FIG. 5, an edge portion 12 of the assembled structural panel is preferably retained during the diffusion bonding of the inflatable envelope assembly to the first and second reinforced titanium composite sheets, such as in a closure or root fitting 42. In particular, both the fitting and the containment die preferably provide a compressive force to the assembled structural panel as shown by the inwardly directed arrows in FIG. 5. Thus, the retained edge portions of the first and second metallic face sheets, the first and second reinforced titanium composite sheets and the inflatable envelope assembly are maintained in a predetermined fixed relationship. Once the structural panel has been formed, it can be cleaned and machined as appropriate to form the resulting part.

In addition, as illustrated in FIG. 6 and as described in the '367 and '821 patents, the expansion of the first and second metallic core sheets 10 generally produces strengthening webs 44 extending between the portions of the first and second metallic core sheets which are joined by the discontinuous weld pattern 22. Accordingly, the strength of the resulting structural panel 40 is further enhanced by the strengthening webs extending between the opposed sides of the structural panel. However, the weight of the resulting structural panel is minimized since the structural panel is generally hollow.

Accordingly, a relatively strong, stiff and lightweight structural panel 40 can be readily fabricated in the predetermined shape. In particular, the structural panel and the associated method of fabrication according to the present invention is particularly useful in creating structural panels having a compound curvature and which must withstand relatively high forces during use. For example, the structural panel of the present invention can readily be employed as an air foil, such as a fan blade 38, as shown in FIG. 7, or as a wing tip 39, as shown in FIG. 8, or a curved leading edge of a wing of an aircraft.

In addition, the method of the present invention provides for the superplastic forming and diffusion bonding of an integral structural panel 40 having a predetermined shape, such as a predetermined compound curvature, which includes a reinforced titanium composite sheet 36 to increase the strength and stiffness of the resulting structural panel by, among other steps, preforming the reinforced titanium composite sheet prior to assembling the components of the panel. In contrast, prior attempts to superplastically form and diffusion bond a structural panel incorporating a flat reinforced titanium composite sheet have been generally unsuccessful since the face sheets 28 and core sheets 10 typically formed about the stronger titanium composite sheet without forming the flat titanium composite sheet into the predetermined shape.

Still further, by preforming the metallic face sheets 28 and the inflatable envelope assembly 14, a structural panel 40 having a predetermined shape, such as a predetermined compound curvature, can be readily formed without wrinkling the metallic face sheets. Thus, the resulting structural panel has, among other things, a relatively smooth exterior surface which improves the appearance, structural integrity, mold line and aerodynamic performance of the resulting part.

In the drawings and the specification, there has been set forth a preferred embodiment of the invention and, although specific terms are employed, the terms are used in a generic and descriptive sense only and not for purpose of limitation, the scope of the invention being set forth in the following claims.

That which is claimed is:

1. A structural panel having a predetermined shape, the structural panel comprising:

a metallic core comprising first and second metallic core sheets having superplastic properties, said first and second metallic core sheets having the predetermined shape, said first and second metallic core sheets disposed in a facing relationship and joined along respective edge portions thereof;

a first reinforced titanium composite sheet bonded to a respective one of said metallic core sheets to thereby form an interior portion of the structural panel, said first reinforced titanium composite sheet also having the same predetermined shape as the respective metallic core sheet; and a pair of metallic face sheets having superplastic properties and formed in the predetermined shape, said pair of metallic face sheets being bonded to and disposed on opposite sides of the interior portion of the structural panel formed by a combination of said metallic core and said first reinforced titanium composite sheet to thereby form an integral structural panel having the predetermined shape, wherein said first reinforced titanium composite sheet has a first predetermined flow stress and said pair of metallic face sheets have a second predetermined flow stress, the first predetermined flow stress being greater than the second predetermined flow stress such that said first reinforced titanium composite sheet increases the relative strength of the structural panel.

2. A structural panel according to claim 1 further comprising a second reinforced titanium composite sheet having the predetermined shape and a third predetermined flow stress, greater than the first predetermined flow stress, wherein the second reinforced titanium composite sheet is disposed adjacent to said metallic core and opposite said first reinforced titanium composite sheet such that said metallic core is sandwiched between said first and second reinforced titanium composite sheets, said second reinforced titanium composite sheet also disposed between and joined to the metallic core and a metallic face sheet such that said metallic core and said first and second reinforced titanium composite sheets are sandwiched between said pair of metallic face sheets.

3. A structural panel according to claim 1 wherein interior portions of said first and second metallic core sheets are joined by a discontinuous weld pattern to thereby form strengthening webs extending between the interior portions of said first and second metallic core sheets which are joined by the discontinuous weld pattern.

4. A structural panel according to claim 1 wherein said metallic core further comprises a plurality of metallic core sheets having superplastic properties, the plurality of metallic core sheets being disposed in a facing relationship to said first and second metallic core sheets and joined thereto along respective edge portions.

5. A structural panel according to claim 1 wherein said first reinforced titanium composite sheet is comprised of a titanium matrix composite material having a plurality of reinforcing fibers embedded therein.

* * * * *